United States Patent Office 3,350,682
Patented Oct. 31, 1967

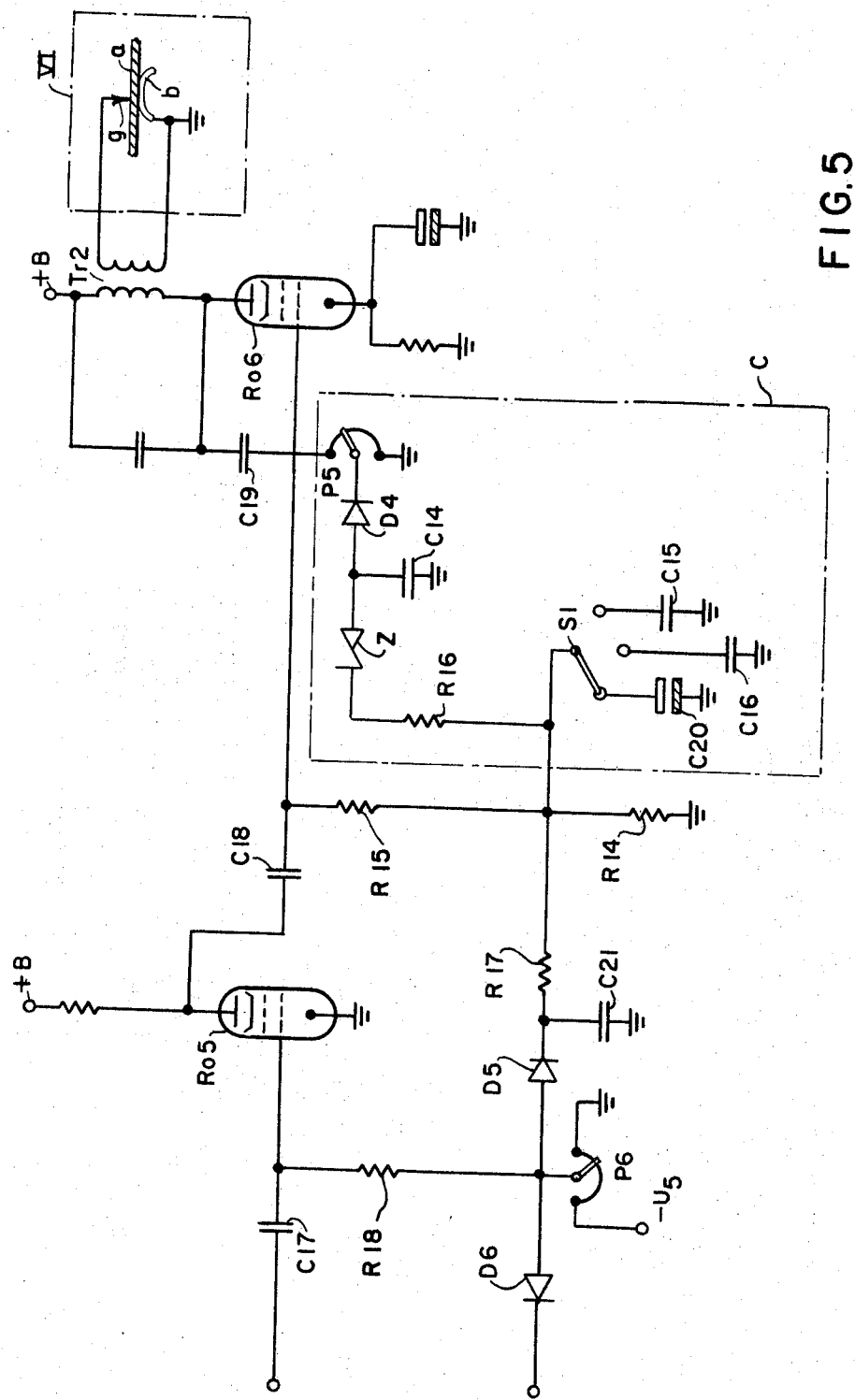

3,350,682
ECHO SOUNDING APPARATUS
Hans Drenkelfort, Kiel-Elmschenhagen, and Gustav Maass, Eutin, Germany, assignors to Electroacustic Gesellschaft mit Beschrankter Haftung, Kiel, Germany, a corporation of Germany
Filed June 28, 1965, Ser. No. 467,204
Claims priority, application Germany, June 26, 1964, E 27,282
11 Claims. (Cl. 340—3)

ABSTRACT OF THE DISCLOSURE

A first gain control is part of an amplifier for amplifying an echo signal voltage in sonar apparatus. A second gain control is joined with the first gain control in opposed control relation thereto. The second gain control has a smaller time constant than the first gain control to counteract the first gain control for an interval of time corresponding to an echo detail to be emphasized in the recording of echo details on an electrically sensitive record sheet in response to the amplified signal voltage.

---

My invention relates to echo sounding apparatus for transmitting and receiving sound waves under water.

Such apparatus involves the problem of sufficiently indicating echo details, stratification of the sea bottom or schools of fish close to the bottom. The electrically sensitive recording paper, although very handy in practical use, can exhibit only a small number of different shades of grey in comparison with the considerably greater changes in echo voltage resulting from structuarl non-uniformities of the object being sounded, so that details of the echo and consequently of the object are obscured by the bottom echo and thus do not yield otherwise available information.

Conceivably the amplification in the echo receiving system could be set to such a low gain that only the peaks of the overall echo signal are located within the blackening range of the recording paper. Then, however, other parts of the overall echo signal are suppressed, although they may also contain detail information. It has accordingly been confirmed, by comprehensive testing with different manually adjusted settings of the amplification gain, that a satisfactory resolution of any particular interesting object detail is not feasible in this manner. It would be futile, therefore, to provide for automatic gain regulation such as employed in radio receivers for equalizing amplitude fluctuation of the carrier signal being received.

It is known to reduce the increase in grey graduation of the paper in dependence upon the writing voltage of the recording instrument by interposing a series resistor between the end stage of the amplifier and the paper. In this manner the rise in grey graduation can be made shallower to any desired extent and the grey-control range can be widened; but the number of available grey stages is not changed in this manner. A disadvantage of such a device is the fact that slight amplitude differences of the echo signals can no longer be perceived as intensity differences.

Also known are devices which compress the echo voltages above a threshold value or which reduce the echo voltages by a countervoltage to a greater or lesser extent, even down to the zero value. There is also a known system in which a monostable multivibrator responds when the threshold value is exceeded and then causes blocking of the signal amplifier for the duration of a pulse. These systems, too, do not afford obtaining sufficiently detailed recordings because these types of regulation either compress the entire echo signal or produce a dead interval of amplifier performance during which the echoes are not amplified and hence not recorded.

It is an object of my invention to provide a sonar system which avoids or greatly minimizes the above-mentioned shortcomings of the known systems and thus improves the resolution of the resulting echo recordings.

The invention is predicated upon the recognition that the problem of a sufficiently detailed recordation on electrically sensitive paper can very well be attained by automatic regulation of the amplifying gain, if a conventional gain regulating device is combined with another regulating device which has a smaller time constant and acts in opposition to the first-mentioned regulating device for an interval of time correlated to the echo details to be emphasized in the recordings.

By virtue of the invention, the echoes stemming from details of the object being sounded are affected by the automatic gain regulation to a lesser extent, or not at all, and consequently are applied to the recording equipment with a greater amount of amplification than the general wave of the comprehensive echo signal. As a further consequence, the contrast of the recorded details is increased so that they are recorded with satisfactory resolution despite the relatively small range of contrast inherent in the paper. Comprehensive tests have shown, for example, that by applying the invention, any beds of clams covered by layers of sand, as they occur off the coast of the United States and are quarried for purposes of road construction, are satisfactorily indicated; and similar results have been observed with layers of mud enclosed within the sea bottom, as well as with beds of mud separated by one or more strata of clay from a larger body of mud.

The above-mentioned and further objects, advantages and features of my invention, said features being set forth in the claims annexed hereto, will be apparent from, and will be described in the following with reference to the accompanying drawings.

FIG. 5 is a schematic circuit diagram of another embodiment of echo sounding equipment according to the invention.

Figure 1:
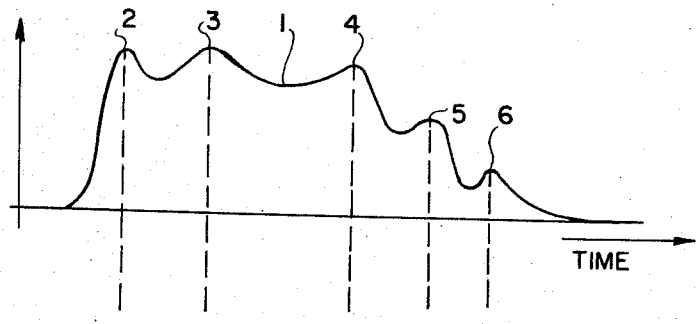
FIG. 1 is an explanatory graph showing schematically a typical amplified but not corrected comprehensive echo signal.

Referring to FIG. 1 there is shown the voltage-time curve of a single echo-signal wave composed of several individual detail echoes stemming from different parts of an object. Such a signal may occur as the output voltage of the sonic-electric transducer in a sonar receiver, for example when sounding at an angle to the sea bottom or when the bottom exhibits a stratified constitution. In the diagram, the horizontal axis denotes time, and the vertical coordinates of the illustrated curve indicate amplitudes of the echo voltage as it appears amplified at the outlet of the receiving amplifier. Denoted by 2 to 6 are individual echoes or echo details. These appear to be only slightly pronounced in comparison with the overall configuration 1 of the echo signal. Relative to each other, however, the individual detail echoes nevertheless exhibit appreciable differences in amplitude, so that all of them cannot be resolved on the record appearing on the electrically sensitive paper of the recording instrument because of the very narrow blackening range of such paper. However, just these individual echoes are the ones that are indicative of bottom fish, individual bottom strata or other objects at the sea bottom which one desires to identify.

Figure 4:
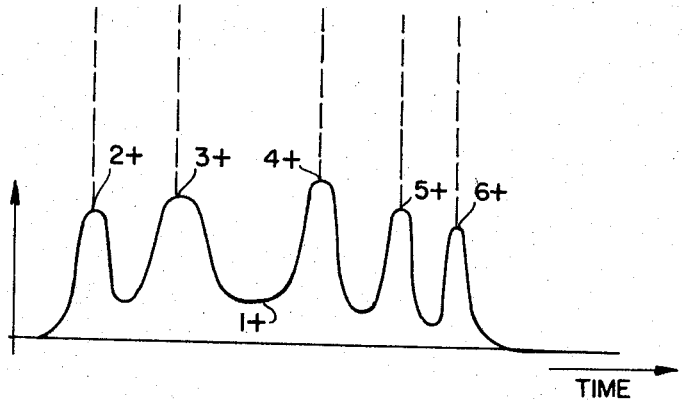
FIG. 4 is an explanatory graph representing a corrected configuration of an echo signal obtained with a system according to the invention and corresponding to the uncorrected signal shown in FIG. 1.

By applying the invention, the echo voltage waves can be corrected, for example as shown in FIG. 4, with the result that the contrast of the individual echoes 2+ to 6+ relative to the overall signal is increased so that the individual echoes become more comspicuous in comparison with the general course of the comprehensive echo voltage 1+ and are located in an amplitude range that corresponds to the grey graduation of the recording paper. Thus all of the detail echoes become simultaneously resolvable in the recording.

Figure 2:
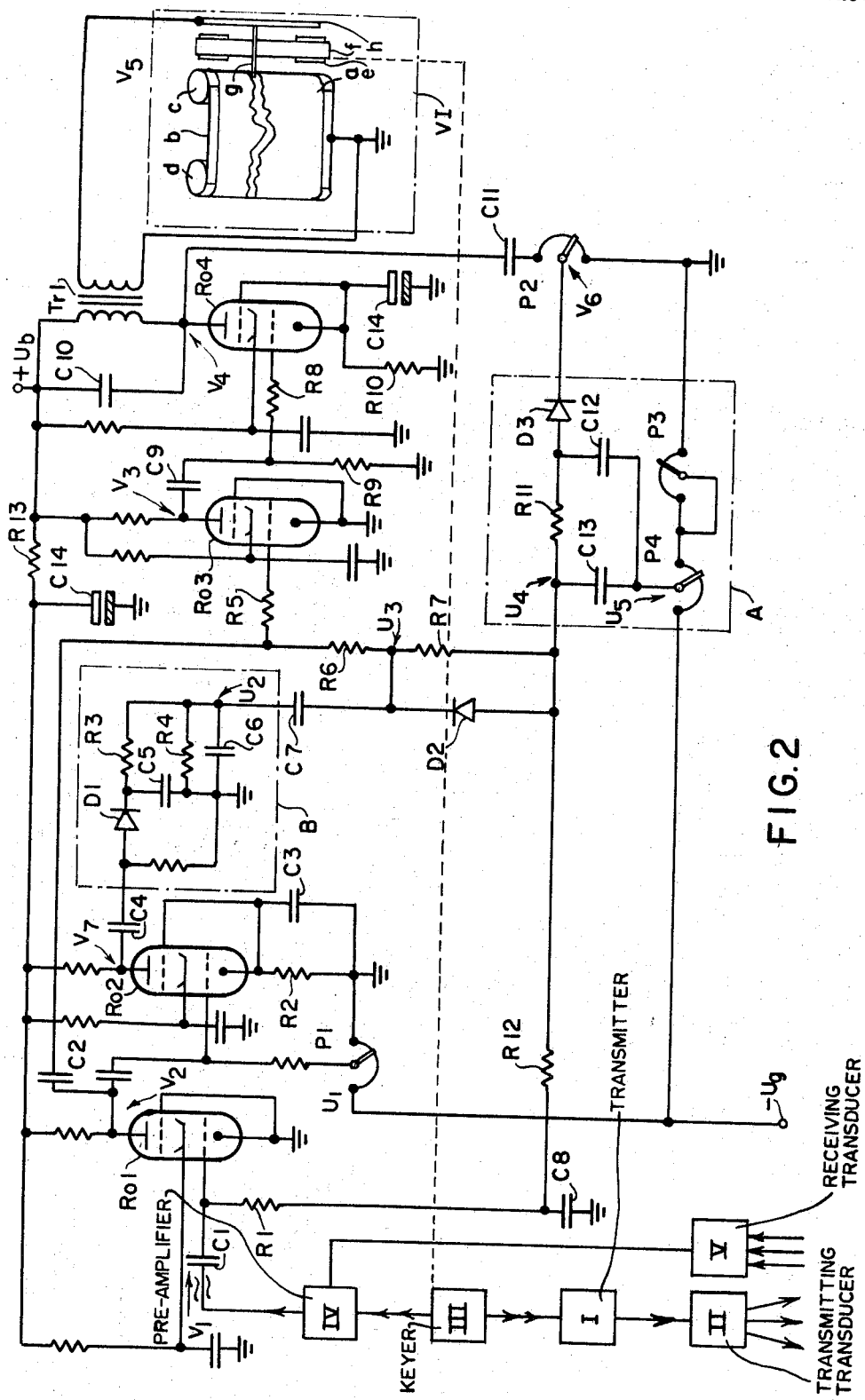
FIG. 2 is an electric circuit diagram of a sonic system embodying the invention by way of example.

The echo sounding apparatus schematically illustrated in FIG. 2 is equipped with a known feedback regulation of the amplifying gain which, according to the invention, is combined with an additional gain regulating device now to be described. Schematically shown at I is the transmitter which issues electric energy to the transmitting transducer II and is controlled by a keyer III which determines the time sequence, as well as the duration of the individual sounding periods. The keyer III may consist, for example, of a mechanical switching device which is coupled with the recorder VI or is constructively or spacially combined therewith. The keyer III also effects switching of a pre-amplifier IV which forms part of the receiver and is connected with the receiving transducer V, the switching being such that the signal amplitudes arriving at the receiving transducer V during the periods of time in which the transmitting transducer II issues sonic pulses, are not amplified in the pre-amplifier IV.

Additional amplifying stages of the receiver are equipped with respective electronic tubes $Ro_1$, $Ro_3$ and $Ro_4$. The echo signal amplified in these stages is applied in the recorder VI to a sheet or tape $a$ of electrically sensitive paper. The sheet $a$, for example, comprises a conductive layer of carbon covered by an opaque layer of paper which during the recording operation is burnt more or less away so that the black carbon layer becomes more or less exposed. The burning effect is produced by a stylus $g$ to which the writing voltage is applied. The writing current passes through the paper to a counter-electrode plate $b$ at the rear of the paper. The large area of the counter electrode serves as a rigid backing for the paper. As a rule, the paper is accommodated on a roller $c$ from which it passes over the electrode plate $b$ to a take-up roller $d$. The advance of the paper is very slow, whereas the stylus $g$ during each sounding period passes across the paper at a much higher, constant speed and then records the echoes in accordance with the sounding depth. The stylus may be mounted on an endless belt $f$ which is trained over two sheaves $e$ and driven by a motor at constant speed. The stylus $g$ is connected with a contact spring engaging a contact bar $h$ for applying the amplifier voltage $V_5$ to the stlyus $g$ and thus to the paper. The endless belt $f$ carries dog pins to coact with stationary switch contacts which constitute the above mentioned keyer III to perform the switching operations already mentioned.

The echo signal voltage $V_1$ amplified in the pre-amplifier IV reaches the gain-regulated main amplifier comprising the tubes $Ro_1$ to $Ro_4$. In tube $Ro_1$ the voltage is further amplified ($V_2$) and supplied to the two tubes $Ro_2$ and $Ro_3$. Tube $Ro_2$ serves as regulating amplifier, as will be explained further below. The voltage amplified in tube $Ro_3$ ($V_3$) reaches the end stage $Ro_4$ which constitutes a power amplifier. A transformer $Tr_1$ serves to match the impedance of tube $Ro_4$ with the paper resistance of the recorder VI. A capacitor $C_{10}$ may be connected parallel to the transformer $Tr_1$ to afford optimal tuning to the echo frequency. An RC-member $R_{10}$, $C_{14}$ in the cathode circuit of tube $Ro_4$ provides cathode bias voltage for correctly adjusting the working point of the tube. A longitudinal resistor $R_8$ prevents short-wave oscillations and overloading of the tube by excessive grid current. Further provided is a grid resistor $R_9$. The tube $Ro_4$ is not regulated as are the other tubes.

The tubes $Ro_1$ and $Ro_3$ are feedback regulated. For this purpose a portion of the anode alternating voltage of tube $Ro_4$ is applied through a capacitor $C_{11}$ to a rectifier network A. The rectifier comprises a diode $D_3$ and a charging capacitor $C_{12}$ which conjointly provide a negative control voltage greatly smoothed by a filter resistor $R_{11}$ and a transverse capacitor $C_{13}$ so that any occurring amplitude modulation of the echo signals virtually vanishes on account of the chosen long time constant $T_1=R_{11} \times C_{13}$. The negative control voltage is superimposed upon a negative bias voltage $U_5$ adjustable by means of a potentiometer $P_4$. The two control grids of respective tubes $Ro_1$ and $Ro_3$ thus receive a composite negative voltage $U_4$ through longitudinal resistors $R_{12}$, $R_1$ and $R_7$, $R_6$ and $R_5$. The capacitors $C_8$, $C_7$ and $C_6$ coact with the longitudinal resistors and decouple the two tubes with respect to alternating currents.

A potentiometer $P_3$ is set for the slightest negative grid bias voltage taken off potentiometer $P_4$ for obtaining highest available amplification, for example in the order of $-2$ volt. The lowest amplifying gain is obtained with the largest negative grid bias voltage at $P_4$, for example in the order of about $-20$ to $-40$ volt.

The control voltage superimposed upon the base voltage $U_5$ is directly proportional to the anode alternating voltage at tube $Ro_4$ and is also dependent upon the setting of the potentiometer $P_2$ (voltage $V_6/V_4$). The potentiometer $P_2$ permits continuously adjusting the degree of automatic feedback regulation between zero and the maximal value dependent upon the parameters of the particular circuitry. The feedback regulation, automatically controlled by the echo signal itself, adjusts the amplifying gain always to the instantaneous median echo amplitudes.

According to the invention, the feedback regulation just described is combined with an opposingly acting regulating device designed as follows. The tube $Ro_2$, corresponding to tube $Ro_3$, supplies an amplified echo voltage $V_7$ to a rectifier network B. A diode $D_1$, in conjunction with a capacitor $C_5$ in this network, produces a positive control voltage. An RC member serves for smoothing the control voltage fluctuating with the modulation of the echo signal. However, the time constant $T_2=R_3 \times C_6$ is considerably shorter than the above-mentioned time constant $T_1$, so that the waviness of the control voltage $U_2$ is considerably greater than that of the control voltage $U_4$. Consequently echo details 2–6 of the comprehensive echo signal (FIG. 1) are only slightly compensated and remain preserved as amplitude variations of the control voltage $U_2$.

The performance of the network B is generally comparable to the demodulation of the radio carrier wave for obtaining modulated low-frequency output in a radio receiver. Only the variations of the control voltage $U_2$ pass through a capacitor $C_7$ to the resistors $R_6$ and $R_7$, this being likewise comparable to the demodulation of radio broadcast waves. These voltage variations become superimposed upon the above-described regulating voltage $U_4$ which affects the automatic feedback regulation.

When the echo amplitude of one of the echo details 2–6 increases, the grid of tube $Ro_3$ becomes less negative for the duration of the echo detail than the voltage $U_4$ of the feedback regulation from network A. As a result, the amplification effected by tube $Ro_3$ for the echo detail increases and the corresponding amplitude of the writing voltage $V_5$ also increases. When the increase in voltage effected by the echo detail in a comprehensive echo signal is terminated, the control voltage $U_2$ no longer varies. Consequently the addition of positive regulating voltage $U_2$ at the grid of tube $Ro_3$ declines to zero; the amplifying gain of the tube is reduced and thus also the writing voltage $V_5$. When new the amplitude of the echo signal which contains the echo detail decreases further, the capacitor $C_7$ passes an additional negative voltage to the grid of tube $Ro_3$, and the amplification is additionally reduced. Upon termination of the echo detail, this voltage also declines to zero, so that the amplifying gain depends only upon the regulating voltage $U_4$ of the conventional feedback regulating network A and the adjusted fixed bias voltage $U_5$. Since the time constant T1 of the negative regulating voltage $U_4$ is chosen so large that the control voltage virtually possesses no waviness, this voltage does not participate in a short-lasting change of the amplifying gain. A consequence of this expedient is the occurrence of a differentiating amplifying gain for the echo details 2–6 on the one hand, and the comprehensive echo signal 1 (FIG. 1) on the other hand, so that an increase in contrast (FIG. 4) is achieved.

This increase in contrast is adaptable to the particular conditions of operation. In the first place, the diode $D_2$ may be provided, whereby the above-described reduction in amplification during amplitude reduction of the echo detail is almost completely prevented. A further possibility of influencing the increase in contrast is the following. By means of the potentiometer $P_1$, the negative basic bias voltage for tube $Ro_2$ can be adjusted between 0 volt and a maximal value of $U_g$, for example about $-20 \ldots -40$ volts. With increasing negative bias voltage, the amplifying gain of the tube decreases and thereby also decreases the effect of the positive control voltage upon the increase of the amplitude differences within an echo signal. The cathode combination $R_2$ and $C_3$ serves for determining the working point for maximal amplification at a basic grid of 0 volt. The amplification of the tube $Ro_2$ may also be influenced for more sharply emphasizing the individual echoes by a choice of the time constant $T_3 = R_2 \times C_3$ of its cathode RC member, namely by selecting the time constant $T_3$ so short that there results a more or less pronounced preference for echo details in the amplification of the echo signal branched off for the superimposed gain regulation.

By virtue of thus combining both regulations, therefore, the details of an echo signal are considerably augmented. The voltage waves of the comprehensive echo signal shown at 1 and 1+ in FIGS. 1 and 4 may serve for illustrating the effect. The differences between the amplitude maximums and minimums, located at about the localities 2, 3, 4, 5, 6, are relatively slight in FIG. 1, but appear considerably larger in FIG. 4. Simultaneously, the difference between the highest amplitude maximum and the lowest amplitude minimum has been reduced. This has the result that the available control range of the blackening effect obtainable on the recording paper can be fully utilized and that the limitation imposed upon the range of contrasts on the paper is compensated by increasing the contrast between the envelope and the individual signal details.

Figure 3:
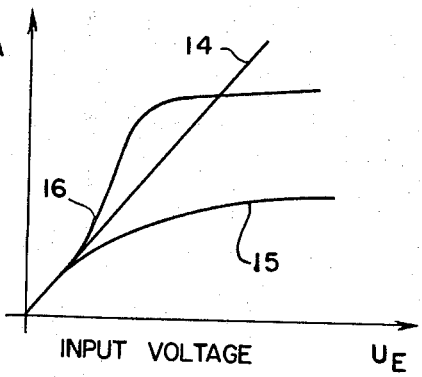
FIG. 3 is a graph of an amplifier characteristic in a system according to the invention.

The performance will be further elucidate with reference to FIG. 3 in which the abscissa denotes input voltage and the ordinate denotes output voltage. The straight line 14 indicates the output voltage $U_A$ in dependence upon the input voltage $U_E$ within the linear range of amplification without any gain control. The curve 15 represents the widening of the control range (larger input voltage for the same amount of output voltage) obtained by feedback regulation with a negative control voltage. The curve 16 represents the operating conditions for a forward regulation with a positive control voltage. With an increase in echo voltage, the output voltage increases to a maximum below curve 16. When the echo voltage is constant, the output voltage declines to a value located approximately on curve 15. Without the diode $D_2$, this voltage value is reduced, when the echo amplitude further declines, to a value far below curve 15. When the echo amplitude is constant, the output voltage again rises to a value approximately corresponding to the curve 15.

A further advantage of the system described with reference to FIG. 2 resides in the fact that with respect to the contrast-emphasizing positive control voltage, which increases the amplifying gain when the echo amplitude increases, there obtains a forward regulation which has not feedback effect upon the generation of the control voltage. On the other hand, the other regulating voltage which widens the control range operates with a negative control obtained by feedback regulation so that the occurrence of overcontrol by increasing contrast is prevented. Since with a feedback regulation, in principle, a constant output voltage can be achieved in spite of a fluctuating input voltage, overcontrol effects as may occur when a forward (positive feedback) regulation is exclusively employed, are reliably preventable.

FIG. 5 shows a further embodiment of an echo-receiving and recording system according to the invention, which is characterized by a particularly simple design.

The tube $Ro_5$ corresponds to tube $Ro_3$ in FIG. 2, and the end stage $Ro_6$ corresponds to the tube $Ro_4$ in FIG. 2. The pre-amplifier, corresponding as to its function to the amplifier denoted by IV in FIG. 2, is not illustrated in FIG. 5. The pre-amplified echo voltage is coupled into the illustrated circuitry through a capacitor $C_{17}$ and is amplified in the regulator tube $Ro_5$. The amplified signal is supplied through a coupling capacitor $C_{18}$ to the grid of tube $Ro_6$. The transformer $Tr_2$ corresponds to transformer $Tr_1$ in FIG. 2 and serves to decouple the writing voltage supplied to the recording device 7 which is only schematically shown in FIG. 5 and may correspond to the one denoted by VI in FIG. 2 and more fully described in the foregoing.

A portion of the anode alternating voltage is supplied to a rectifier network C through a capacitor $C_{19}$ and a potentiometer $P_5$. Assume that the illustrated Zener diode Z is omitted. The negative control voltage is applied to a resistor $R_{14}$ which forms part of the grid bias resistance for tube $Ro_6$. A switch $S_1$ permits selectively connecting two capacitors $C_{15}$ and $C_{16}$ parallel to the resistor $R_{14}$. In this manner, the time constant for the control voltage can be selectively varied in conjunction with the longitudinal resistor $R_{16}$. The negative control voltage, together with the alternating voltage supplied through capacitor $C_{18}$, reaches the grid tube $Ro_6$. With increasing echo voltage the grid bias voltage becomes more negative and hence the tube operates on a less steep portion of its characteristic. The effectiveness of the feedback regulation is increased by the fact that the negative control voltage is supplied through resistor $R_{17}$ and a gate diode $D_5$ to the grid resistor $R_{18}$ of the regulating tube $Ro_5$. The gate diode $D_5$ further permits regulating the basic amplification by means of a negative bias voltage which is adjustable at a potentiometer $P_6$. A further gate diode $D_6$ permits passing a decaying negative pulse to the grid of $Ro_5$ in order to control the amplification in dependence upon the measuring distance in known manner.

Aside from the above-mentioned general regulation of the amplifying gain, there occurs an increase in contrasts which is achieved by virtue of the fact that, due to the choice of a small time constant $T_3$ of the RC-member $R_{16}$ with $C_{15}$ or $C_{16}$, the negative control voltage is built up with just as much delay relative to the individual echo details 2–6, as is permissible for preventing a new regulating voltage from being built up at tubes $Ro_5$ and $Ro_6$ driving one of the echo details 2–6, but as is nevertheless sufficient for a regulating voltage to occur at least at tube $Ro_6$ subsequent to the particular echo detail or individual echo, so that the individual echo is more definitely distinguished from the other parts of the comprehensive echo signal. The displacement of the working point for tube $Ro_6$ into the more negative and less steep portion of the characteristic is thus likewise delayed. The writing voltage, therefore, increases first approximately proportionately to the input voltage, for example in accordance with the characteristic represented by the straight line 14 in FIG. 3. However, after the control voltage has been built up upon occurrence of an echo detail 2–6, the amplifying gain of the tube declines and so does the writing voltage, for example down to a value between line 14 and curve 15. If the echo amplitude maintains this value an additional amount of time, the negative control voltage for the pre-amplifier tube $Ro_5$ becomes effective on account of the longer time constant $R_{17} \times C_{21}$; the output voltage therefore drops to a lower value which may correspond to curve 15 in FIG. 3. The time delay with which the second regulation commences depends upon the time constant $T_4 = R_{17} \times C_{21}$, whereas the shorter time for delay of the reduction in amplifying gain for tube $Ro_6$ is determined by the considerably shorter time constant $T_3 = R_{16} \times C_{15}$ or $C_{16}$. The switching of the time constants by means of $C_{15}$ and $C_{16}$ permits an adaptation to local measuring conditions. For pure vertical sounding, it is generally preferable to operate with a shortest possible time constant, for example with approximate values for $C_{15}$ of 1 to 5 micromicrofarads and $R_{16/17}$ of 50 to 100 kilohms; whereas for slanting or horizontal sounding, particularly of schools of fish close to the sea bottom or for sounding of bottom irregularities, a longer time constant is suitable. However, the value of the time constant depends essentially upon the duration of the transmitter pulse and is generally about 20 to 300 times longer than for vertical sounding ($C_{16}$=about 20 . . . $300 \times C_{15}$).

To prevent the feedback regulation from operating at relatively slight signal intensities, the regulating voltage is preferably electrically delayed additionally, namely so that the control voltage can be developed only when a threshold value is exceeded. In the embodiment shown in FIG. 5, the delay is secured by the Zener diode Z connected in series with resistor $R_{16}$. A favorable amount of delay is obtained in the range between about 6 and 25 volts delay potential.

The potentiometer $P_5$ also permits giving the feedback regulation different adjustments. When the potentiometer slider is in the lowermost position where it is grounded, the feedback regulation and contrast augmentation are switched off.

The effectiveness can be further increased by providing for a plurality of threshold values. For example, in apparatus as shown in FIG. 2, respective threshold values may be provided for the negative feedback and the superimposed positive feedback. Preferably, the threshold value for the negative feedback is correlated to the output voltage of the amplifier, and the threshold value for the positive feedback is correlated to the input voltage.

To permit operating with feedback-regulated gain control without raising the contrast, a very large time constant may be chosen. For this purpose, for example, the switch $S_1$ (FIG. 5) is placed to the illustrated left-hand position in which the relatively very large capacitor $C_{20}$ is switched on so that the control voltage hardly exhibits any waviness and assumes a voltage value approximately corresponding to the sum value of all echo voltages which, as a rule, varies only slightly within a few sounding periods.

To those skilled in the art, it will be obvious upon a study of this disclosure that my invention permits of various modifications and may be given embodiments other than particularly illustrated and described herein, without departing from the essential features of my invention and within the scope of the claims annexed hereto.

We claim:

1. With sonar apparatus having a sonic-electric transducer for providing an echo signal voltage, electronic amplifier means for amplifying said signal voltage, and a recorder connected to said amplifier means for recording echo details on an electrically sensitive record sheet in response to the amplified signal voltage, in combination, first gain control means forming part of said amplifier means, and second gain control means joined with said first gain control means in opposed control relation thereto and having a smaller time constant than said first gain control means to counteract said first gain control means for an interval of time corresponding to an echo detail to be emphasized in the resulting recording.

2. In sonar apparatus according to claim 1, said first gain control means comprising a dynamic compression gain control circuit, and said second gain control means comprising a dynamic expansion circuit.

3. In sonar apparatus according to claim 1, said amplifier means having circuit branches of different voltages respectively, and said two gain control means being connected to separate ones of said circuit branches.

4. In sonar apparatus according to claim 1, at least one of said two gain control means comprising threshold means defining a threshold voltage above which the gain control commences to operate.

5. In sonar apparatus according to claim 4, said threshold means comprising a Zener diode.

6. With sonar apparatus having a sonic electric transducer for providing an echo signal voltage, electronic amplifier means for amplifying said signal voltage, and a recorder connected to said amplifier means for recording echo details on an electrically sensitive record sheet in response to the amplified signal voltage, in combination, first gain control means forming a negative feedback of said amplifier means, second gain control means forming a positive feedback of said amplifier means and having a shorter time constant than said negative feedback to counteract the latter for an interval of time corresponding to an echo detail to be emphasized in the resulting recording.

7. In sonar apparatus according to claim 6, said amplifier means having an amplifying forward path between said transducer and said recorder, and said respective positive and negative feedbacks forming two voltage branches electrically parallel to said forward path.

8. In sonar apparatus according to claim 6, said amplifier means comprising several cascade stages, said two feedbacks being connected to, and energized from, different ones of said stages, said positive feedback being connected to the stage having the lower voltage.

9. In sonar apparatus according to claim 8, said positive feedback comprising an additional amplifier.

10. In sonar apparatus according to claim 9, said positive feedback comprising an RC-member connected to the cathode of said additional amplifier and having likewise a smaller time constant than said negative feedback for augmenting the emphasized detail recordings.

11. In sonar apparatus according to claim 6, each of said two feedback circuits comprising threshold means defining a threshold voltage above which the gain control commences to operate, said threshold voltage of said negative feedback being coordinated to the amplifier output voltage, and said threshold voltage of said positive feedback being coordinated to the input voltage.

References Cited

UNITED STATES PATENTS 3,094,681  6/1963  Kietz et al. _____ 340—3
3,109,154  10/1963  Grada et al. _____ 340—3

RICHARD A. FARLEY, *Primary Examiner.*